United States Patent
Han et al.

(10) Patent No.: US 11,470,586 B2
(45) Date of Patent: Oct. 11, 2022

(54) UPLINK CONTROL CHANNEL RESOURCE ALLOCATION METHODS AND DEVICES

(71) Applicant: ZTE Corporation, Guangdong (CN)

(72) Inventors: Xianghui Han, Guangdong (CN); Shuqiang Xia, Guangdong (CN); Chunli Liang, Guangdong (CN); Wei Gou, Guangdong (CN); Jing Shi, Guangdong (CN); Wen Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 169 days.

(21) Appl. No.: 16/800,600

(22) Filed: Feb. 25, 2020

(65) Prior Publication Data

US 2020/0196304 A1 Jun. 18, 2020

Related U.S. Application Data

(63) Continuation of application No. PCT/CN2017/101094, filed on Sep. 8, 2017.

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1812* (2013.01); *H04L 5/0007* (2013.01)

(58) Field of Classification Search
CPC combination set(s) only.
See application file for complete search history.

(56) References Cited

U.S. PATENT DOCUMENTS

| 8,797,985 | B2* | 8/2014 | Larsson | H04L 5/0094 |
| | | | | 370/252 |
| 10,027,539 | B2* | 7/2018 | Song | H04W 72/1284 |
| 2010/0074209 | A1* | 3/2010 | Montojo | H04L 5/0066 |
| | | | | 455/501 |
| 2013/0215803 | A1 | 8/2013 | Lee et al. | |
| 2016/0337086 | A1 | 11/2016 | Shen et al. | |

(Continued)

FOREIGN PATENT DOCUMENTS

| CN | 105992361 A | 10/2016 |
| CN | 106162888 A | 11/2016 |

(Continued)

OTHER PUBLICATIONS

Examination Report for Australian Patent Application No. 65513ZTE/KER, dated Sep. 18, 2020.
(Continued)

*Primary Examiner* — Hanh N Nguyen
(74) *Attorney, Agent, or Firm* — Perkins Coie LLP

(57) ABSTRACT

Physical Uplink Control Channel (PUCCH) can be effectively allocated and utilized by base stations and mobile stations. In an exemplary embodiment, a mobile station receives from a base station an allocation of a first set channel resource groups. The base station assigns a second set of channel resource groups. The mobile station decodes, based on the second set of channel resource groups, one or more channel resources to transmit messages to the base station. A benefit of the disclosed exemplary embodiments is that a base station can dynamically assign channel resources to a mobile station.

18 Claims, 7 Drawing Sheets

(56) References Cited

U.S. PATENT DOCUMENTS

| | | | |
|---|---|---|---|
| 2016/0359663 A1* | 12/2016 | Song | H04L 5/14 |
| 2017/0048052 A1 | 2/2017 | Lee et al. | |
| 2021/0152211 A1* | 5/2021 | Matsumura | H04L 5/0091 |

FOREIGN PATENT DOCUMENTS

| | | |
|---|---|---|
| CN | 106658742 A | 5/2017 |
| CN | 106922031 A | 7/2017 |
| CN | 106954262 A | 7/2017 |
| CN | 106954526 A | 7/2017 |
| CN | 110945932 A | 3/2020 |
| JP | 2013-542685 A | 11/2013 |
| WO | 2017076157 A1 | 5/2017 |
| WO | 2018204491 A1 | 11/2018 |

OTHER PUBLICATIONS

Second Examination Report for Australian Patent Application No. 65513ZTE/KER, dated Nov. 2, 2020.

Sharp, "Group common PDCCH for NR," 3GPP TSG RAN WG1 Meeting #89, Hangzhou, China, R1-1708372, May 2017.

Office Action for Chinese Patent Application No. 201780093714.3, dated Oct. 10, 2020.

Qualcomm Inc., "Resource allocation for PUCCH," TSG-RAN WG1 Meeting #90, Prague, Czech, , R1-1713436, Aug. 2017.

"Draft Report of 3GPP TSG RAN WG1 #90 v0.1.0," 3GPP TSG RAN WG1 Meeting #90bis, Prague, Czech, R1-171xxxx, Oct. 2017.

Office Action for Korean Patent Application No. 10-2020-7010119, dated Jul. 16, 2021 (with English summary), 6 pages.

Intel Corporation, "Long PUCCH design aspects," 3GPP TSG RAN WG1 Meeting #88bis, Spokane, Washington, R1-1705031, Apr. 2017.

Huawei et al., "Remaining issues for dynamic adaptation of PUCCH formats for HARQ-ACK feedback," 3GPP TSG RAN WG1 Meeting #83, Anaheim, California, Nov. 2015.

Office Action for Japanese Patent Application No. 2020-513857, dated Jun. 1, 2021 (7 pages).

ZTE, "UL control for CBG," 3GPP TSG RAN WG1 NR Ad-Hoc#2, Qingdao, P.R. China, R1-1710019, Jun. 2017.

Samsung, "Resource Allocation for PUCCH with HARQ-ACK," 3GPP TSG RAN WG1 Meeting #90, Prague, Czechia, R1-1713631, Aug. 2017.

Office Action for Chinese Patent Application No. 201780093714.3, dated Feb. 22, 2021.

International Search Report and Written Opinion dated May 30, 2018 for International Application No. PCT/CN2017/101094, filed on Sep. 8, 2017 (6 pages).

Extended European Search Report for European Patent Application No. 17924259.9, dated Aug. 24, 2020.

Office Action for Korean Patent Application No. 10-2020-7010119, dated Oct. 12, 2021 (with English summary), 6 pages.

First Examination Report for Indian Patent Application No. 202047009297, dated Oct. 20, 2021 (6 pages).

Intel Corporation, "Long PUCCH over multiple slots," 3GPP TSG RAN WG1 Meeting #90, Prague, P. R. Czechia, R1-1712581, Aug. 2017.

Nokia Networks, "Dynamic PUCCH format adaptation," 3GPP TSG RAN WG1 Meeting #83, Anaheim, USA, R1-157126, Nov. 2015.

Decision to Grant for Japanese Patent Application No. 2020-513857, dated Nov. 30, 2021 (5 pages).

Nokia et al., "PUCCH resource allocation," 3GPP TSG RAN WG1 #90, Prague, Czech Republic, R1-1714079, Aug. 2017 (3 pages).

Office Action for Korean Patent Application No. 10-2020-7010119, dated Jan. 3, 2022 (with English summary), 8 pages.

Communication pursuant to Article 94(3) EPC for European Patent Application No. 17924259.9, dated Apr. 25, 2022.

Nokia et al., "On the resource allocation for PUCCH," 3GPP TSG RAN WG1#89, Hangzhou, P.R. China, R1-1708516, May 2017.

LG Electronics, "Discussion on NR-PUCCH resource allocation," 3GPP TSG RAN WG1 Meeting #88, Athens, Greece, R1-1702483, Feb. 2017.

ZTE, "NR PUCCH resource allocation," 3GPP TSG RAN WG1 NR Ad-Hoc#2, Qingdao, P.R. China, R1-1710117, Jun. 2017.

Office Action for Chinese Patent Application No. 202111010105.1, dated Jun. 6, 2022 (10 pages).

LG Electronics, "Design of short NR-PUCCH for up to 2 UCI bits," 3GPP TSG RAN WG1 Meeting #90, Prague, Czech Republic, R1-1713174, Aug. 2017.

Office Action for Korean Patent Application No. 10-2020-7010119, dated Jul. 1, 2022 (with English summary), 10 pages.

Office Action for Korean Patent Application No. 10-2022-7010582, dated Jul. 1, 2022 (with English summary), 6 pages.

\* cited by examiner

UPLINK CONTROL CHANNEL RESOURCE ALLOCATION METHODS AND DEVICES

CROSS REFERENCE TO RELATED APPLICATIONS

This patent document is a continuation of and claims the benefit of priority to International Patent Application No. PCT/CN2017/101094, filed on Sep. 8, 2017. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This disclosure relates to methods, systems, and devices for allocating physical uplink control channel (PUCCH) resources.

An exemplary embodiment discloses a wireless communication method. The exemplary method comprises receiving, by a mobile station, a first indication of a first set of channel resource groups allocated for the mobile station, each channel resource group comprising at least one channel resource, receiving, by the mobile station, a second indication of a second set of channel resource groups assigned to the mobile station, the first set of channel resource groups including the second set of channel resource groups, wherein the second indication is configured to indicate one or more channel resources belonging to the first set of channel resource groups, and transmitting, by the mobile station, one or more messages using the one or more channel resources.

In some embodiments, the first set of channel resource groups includes at least two channel resource groups having a different number of channel resources from each other. In some embodiments, the first set of channel resource groups includes at least two channel resources groups, each of the at least two channel resource groups includes the one or more channel resources decoded by the mobile station. In some embodiments, wherein the second set of channel resource groups includes the one or more channel resources decoded by the mobile station.

In some embodiments, the second indication received by the mobile station includes a first channel resource group index that identifies a first channel resource group included in the second set of channel resource groups assigned to the mobile station. In an exemplary embodiment, the first set of channel resource groups includes a second channel resource group, the mobile station calculates a second channel resource group index that identifies the second channel resource group, and the second channel resource group index is a function of the first channel resource group index and a predetermined value. In some embodiments, the second channel resource group index is calculated by adding the first channel resource group index and the predetermined value.

In some embodiments, the one or more messages includes any one or more of an acknowledgement (ACK) message and a non-acknowledgement (NACK) message.

In some embodiments, the receiving of the first indication comprises receiving a radio resource control (RRC) message allocating the first set of channel resource groups to the mobile station. In some embodiments, the receiving of the second indication comprises receiving a downlink control information (DCI) assigning the second set of channel resource groups to the mobile station.

In some embodiments, the exemplary method further comprises receiving, by the mobile station, a radio resource control (RRC) message comprising a physical uplink control channel (PUCCH) resource value, and mapping, by the mobile station, the PUCCH resource value in any one or more of a time domain, a frequency domain, and a code domain.

In some embodiments, the exemplary method further comprises receiving, by the mobile station, the radio resource control (RRC) message comprising at least one resource set, including any one or more of a HARQ-ACK timing value, a PUCCH format type, a PUCCH length, a channel resource group index, a time domain orthogonal cover code (OCC), and a frequency domain OCC.

In some embodiments, the exemplary method further comprises receiving, by the mobile station, a radio resource control (RRC) message comprising a cyclic shift index set that includes either two or four cyclic shift indices, wherein the one or more channel resources used to transmit the one or more messages includes either two or four cyclic shift indices.

In some embodiments, the exemplary method further comprises receiving, by the mobile station, a radio resource control (RRC) message comprising a PUCCH length, a resource block index, and a channel resource group index.

In an exemplary embodiment, the channel resources are physical uplink control channel (PUCCH) resources. In some embodiments, the first set of channel resource groups includes at least one channel resource group. In some embodiments, the second set of channel resource groups includes at least one channel resource group.

Another exemplary embodiment discloses a wireless communication method performed in a base station. The exemplary method comprises transmitting a first indication of a first set of channel resource groups allocated for each of the plurality of mobile stations, each channel resource group comprising at least one channel resource, transmitting a second indication of a second set of channel resource groups assigned to each of the plurality of mobile stations, the first set of channel resource groups including the second set of channel resource groups, wherein the second indication is configured to indicate one or more channel resources belonging to the first set of channel resource groups, and receiving, from at least one of the plurality of mobile stations, one or more messages on the one or more channel resources.

In some embodiments, the first set of channel resource groups includes at least two channel resource groups having a different number of channel resources from each other. In some embodiments, the first set of channel resource groups includes at least two channel resources groups, each of the at least two channel resource groups includes the one or more channel resources. In some embodiments, the second set of channel resource groups includes the one or more channel resources.

In some embodiments, the second indication transmitted by the base station includes a first channel resource group index that identifies a first channel resource group included in the second set of channel resource groups assigned to each of the plurality of mobile stations.

In some embodiments, the one or more messages includes any one or more of an acknowledgement (ACK) message and a non-acknowledgement (NACK) message.

In some embodiments, the transmitting of the first indication comprises transmitting a radio resource control (RRC) message allocating the first set of channel resource groups to each of the plurality of mobile stations. In some embodiments, the transmitting of the second indication comprises transmitting a downlink control information (DCI) assigning the second set of channel resource groups to each of the plurality of mobile stations.

In some embodiments, the exemplary method performed in the base station further comprises transmitting to the plurality of mobile stations a radio resource control (RRC) message comprising at least one resource set, including any one or more of a HARQ-ACK timing value, a PUCCH format type, a PUCCH length, a channel resource group index, a time domain orthogonal cover code (OCC), and a frequency domain OCC.

In some embodiments, the exemplary method performed in the base station further comprises transmitting to the plurality of mobile stations a radio resource control (RRC) message comprising a radio resource control (RRC) message comprising a PUCCH length, a resource block index, a cyclic shift index set, and a channel resource group index, wherein the cyclic shift index set includes either two or four cyclic shift indices.

In some embodiments, the channel resources are physical uplink control channel (PUCCH) resources. In some embodiments, the first set of channel resource groups includes at least one channel resource group. In some embodiments, the second set of channel resource groups includes at least one channel resource group.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

The physical uplink control channel (PUCCH) is a wireless channel used to transmit information from the mobile stations to the base station. For example, the mobile station may use the PUCCH to transmit information such as an Acknowledgement (ACK) and a Non-Acknowledgement (NACK). The mobile station transmits ACK/NACK to the base station to inform the base station whether the mobile station has properly decoded the data transmitted by the base station.

In LTE, LTE-A and 5G systems, a sequence selection transmission scheme allows transmission of one to two bits of acknowledgement (ACK) message or non-acknowledgement (NACK) message on the shortened PUCCH solution. Thus, channel resource sequences are used to carry information. But, carrying the information on the channel resources sequences also consumes more resources. For example, the transmission of one bit uses two channel resources, and transmission two bits uses four channel resources.

Currently, mobile stations use only one PUCCH channel resource for a PUCCH transport format. However, sequence selection based PUCCH uses more than one PUCCH channel resources for each antenna port. Thus, current systems lack an effective method of controlling channel resources for sequence selection PUCCH. Moreover, the number of channel resources used by the mobile station for ACK/NACK may dynamically change. For example, the number of bits for transmission of the HARQ-ACK (Hybrid Automatic Repeat reQuest Acknowledgement) by the mobile station can dynamically change. Thus, there is a need to effectively and dynamically allocate channel resources to the mobile station.

In addition, signaling overhead can become large if resource information fluctuate dynamically, and if the resource information is notified by the physical layer signaling. The resource information can include, for example, the number of time-domain symbols included in the PUCCH channel, the symbol start position, and the timing relationship between the PDSCH and the PUCCH. Thus, there is a need for devices and methods for indicating resource information associated with PUCCH to facilitate a lower physical layer signaling overhead. Therefore, the exemplary embodiments disclose, among other things, a flexible channel resource allocation method for the uplink control channel.

Figure 1:
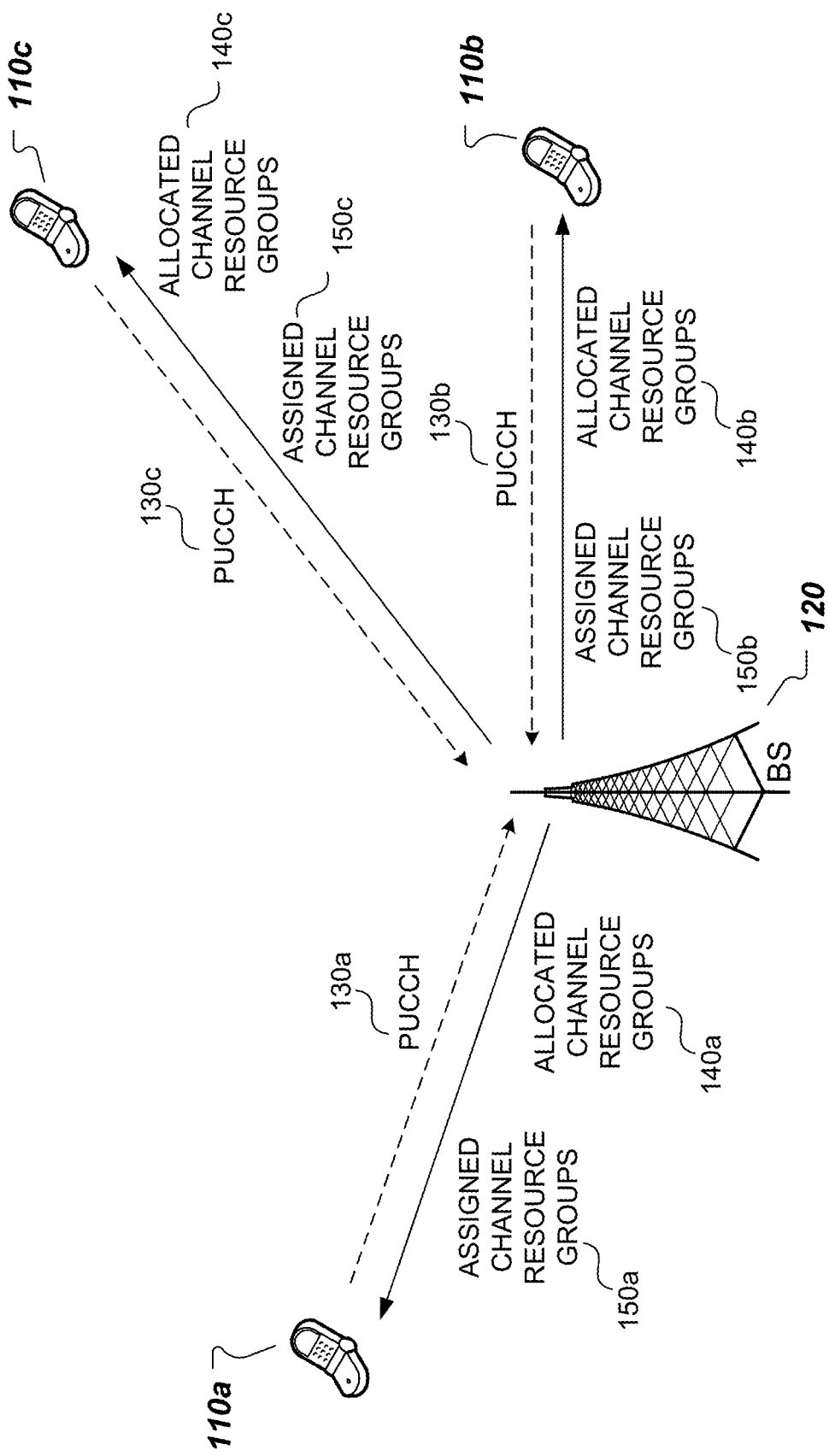
FIG. 1 shows an exemplary base station and mobile stations managing and utilizing PUCCH channel resource groups.

FIG. 1 shows an exemplary base station and mobile stations managing and utilizing PUCCH channel resource groups. The base station (120) transmits a first indication of a first set of channel resource groups (140a-140c) allocated to each of the plurality of mobile stations (110a-110c). The mobile stations (110a-110c) transmit to the base station (120) one or more messages using one or more PUCCH channel resources (130a-130c). The various features of FIG. 1 are described in the sections that follow.

In the following sections, the various examples further describe the allocation, assignment, and utilization of channel resource groups. The example headings are used to facilitate the understanding of the disclosed subject matter and do not limit the scope of the claimed subject matter in any way. Accordingly, one or more features of one example can be combined with one or more features of another example.

Exemplary Embodiments for Allocation, Assignment, and Utilization of Channel Resource Groups Example 1

In some embodiments, the base station (120) configures or allocates a first set of channel resource groups (140a) that may include, for example, four channel resource groups allocated to a mobile station (110a). The base station (120) can allocate the first set of channel resource groups (140a) by transmitting to the mobile station (110a) a first indication using an upper layer radio resource control (RRC) message. In some embodiments, the first set of channel resource groups may include at least one channel resource group. In some other embodiments, the first set of channel resource groups may include two or more channel resource groups where at least two channel resource groups have a different number of channel resources from each other. For example, two of the four channel resource groups may include two channel resources, and the other two channel resource groups may include four channel resources. The number of channel resource groups comprising the same number of channel resources can be a predetermined value or it can be RRC configurable.

The base station (120) also transmits a second indication of a second set of channel resource groups (150a) assigned to a mobile station (110a). The base station (120) can transmit the second indication to the mobile station (110a) by transmitting, for example, two bits in the downlink control information (DCI). Continuing with the example where the base station (120) allocates four channel resource groups to mobile station (110a), the second set of channel resource groups assigned to the mobile station (110a) may include one channel resource group of the four allocated channel resource groups. The one channel resource group assigned to mobile station (110a) may include two channel resources. In this example, the second indication can identify the one channel resource group assigned to the mobile station (110a). In some embodiments, the first set of channel resource groups may include the second set of channel resource groups.

In some embodiments, the mobile station (110a) can use all of the channel resources in the assigned channel resource group to transmit ACK/NACK. For example, the mobile station (110b) may transmit ACK/NACK using the two channel resources in the assigned channel resource group.

The mobile station (110a) may decode one or more channel resources based on the received second indication. The one or more channel resources are included in the first set of channel resource groups. The mobile station (110a) can transmit one or more messages using the decoded one or more channel resources. The one or more messages includes any one or more of an acknowledgement (ACK) message and a non-acknowledgement (NACK) message.

As mentioned above, in some embodiments, the first set of channel resource groups may include two or more channel resource groups where at least two channel resource groups have a different number of channel resources from each other. In some other embodiments, the first set of channel resource groups includes at least two channel resources groups, each of the at least two channel resource groups includes the one or more channel resources decoded by the mobile station. In yet other embodiments, the second set of channel resource groups includes the one or more channel resources decoded by the mobile station.

Example 2

As another example, the base station (120) may configure or allocate four channel resource groups to the mobile station (110b) through the upper layer RRC using the exemplary process of Example 1. In this example, each channel resource group may have four channel resources. Using the exemplary process of Example 1, the base station (120) assigns one channel resource group of the four channel resource groups through the two bits in the DCI to the mobile station (110b).

In some embodiments, the mobile station (110b) can use only some of the channel resources in the assigned channel resource group to transmit ACK/NACK. The mobile station (110b) can determine the number of channel resources based on the number of ACK/NACK transmission bits. The transmission of one bit uses two channel resources, and transmission two bits uses four channel resources. Continuing with the example, the mobile station (110b) may transmit ACK/NACK using only the first two channel resources of the four channel resources in the assigned channel resource group.

Example 3

As another example, the base station (120) may configure or allocate four channel resource groups to the mobile station (110c) through the upper layer RRC using the exemplary process of Example 1. In this example, each group may have two channel resources. Using the exemplary process of Example 1, the base station (120) assigns one channel resource group of the four channel resource groups through the two bits in the DCI to the mobile station (110c).

In this example, the second indication includes a first channel resource group index, m that identifies a first channel resource group included in the second set of channel resource groups assigned to the mobile station (110c). As an example, the first channel resource group index, m may be a preset value such as zero or one. The mobile station (110c) may use the first channel resource group to transmit the ACK/NACK. In this embodiment, the mobile station (110c) may, if needed for additional ACK/NACK transmissions, calculate a second channel resource group index that identifies a second channel resource group included in the first set of channel resource groups. In some embodiments, the second channel resource group index is a function of the first channel resource group index, m, and a predetermined value, k. For example, second channel resource group index can be calculated by adding the first channel resource group index, m, and the predetermined value, k. As an example, the value of k can be set to one.

In some other embodiments, the second indication may include all the channel resource groups assigned to the mobile station (110c). For example, if two channel resource groups are assigned to the mobile station (110c), then the mobile station (110c) may receive two channel resource group indices m1 and m2 in a DCI from the base station.

Example 4

Figure 2:
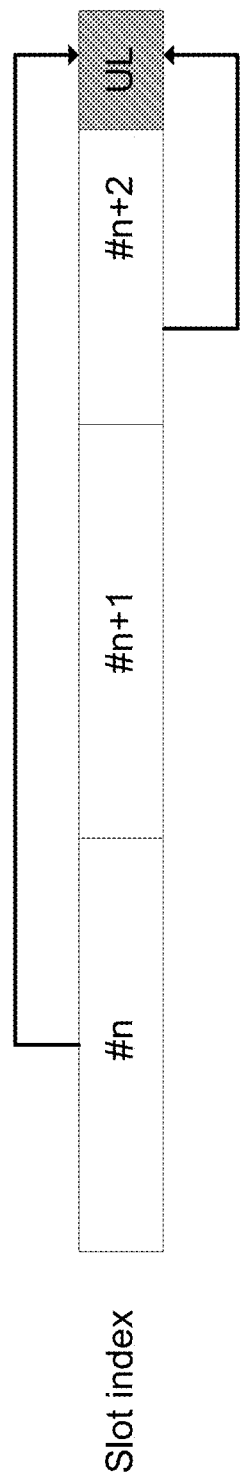
FIG. 2 illustrates an increase in number of resources for transmitting ACKs/NACKs due to anew downstream traffic transmission.

In an exemplary embodiment, a mobile station can transmit a PUCCH feedback at one time slot for downlink transmissions that are performed at different time slots. As shown in FIG. 2, the ACK/NACK feedback for slot #n and slot #n+2 can be performed on the short PUCCH of slot #n+2. At slot #n+2, the channel resources notified by the base station for slot #n may no longer be applicable due to the new downstream transmission at slot #n+2. Thus, the base station notifies the latest channel resources for slot #n+2 to replace the resources for slot #n.

FIG. 2 illustrates the increase in the number of resources for transmitting ACKs/NACKs due to the new downstream traffic transmissions on slot #n+2. Further, the number of resources will also increase for transmitting ACKs/NACKs because, as shown in FIG. 2, the mobile station transmits ACKs/NACKs for slot #n and slot #n+2 in slot #n+2. To avoid possible waste of resources, the RRC can configure the corresponding channel resources for feedback one bit, two bits, or more than two bits when configuring the channel resources. Thus, in some embodiments, the base station allocates the channel resources using RRC. In some embodiments, the base station may use DCI to dynamically assign channel resources to the mobile station that may need additional resources for transmission of ACKs/NACKs.

In some other embodiments, the downlink transmission with different Transmission Time Interval (TTI) length may also lead to the dynamic change of the number of ACK/NACK to be transmitted. For example, if one bit ACK/NACK associated with a 1ms physical downlink shared channel (PDSCH) in TTI #n is to be transmitted in the PUCCH in TTI #n+4, then the base station or eNB schedules one shortened PDSCH transmission in TTI #n+3. The corresponding one bit ACK/NACK will be transmitted in a shortened PUCCH in TTI #n+4. In this example, the ACK/NACK associated with PUCCH can be piggybacked into the shortened PUCCH, which causes the number of ACK/NACK to be transmitted in the shortened PUCCH to increase to two bits.

In some other embodiments, the number of ACK/NACK bits may also dynamic change in case of carrier aggregation (CA) scenario.

In some other embodiments, HARQ-ACK bundling for two bits HARQ-ACK may be used in a slot with scheduling request (SR) transmission opportunities. In such an embodiment, the number of HARQ-ACK bits may also dynamically change. In some embodiments, the base station or the eNB can use the methods discussed in this patent document for PUCCH resource allocation to adjust for the dynamically changing number of HARQ-ACK bits. In some other embodiments, the base station or eNB can configure a separate set of PUCCH resources to the mobile station for the slots with SR transmission opportunities and the slots without SR transmission opportunities. For example, the set of resources for HARQ-ACK transmission in the slots without SR transmission opportunities can be a subset of the resources for HARQ-ACK transmission in the slots without SR transmission opportunities.

Example 5

In another example, the base station (120) may transmit to mobile station (110a) information from a PUCCH resource table as shown in Table 1 below. In some embodiments, the base station (120) may transmit to the mobile station (110a) information such as HARQ-ACK timing value (k), PUCCH format type, PUCCH length and PUCCH resource value, and group index or channel resource group index.

The exemplary Table 1 is an example of a resource set transmitted to a mobile station that includes 16 groups, each of which includes resource information. In some embodiments, more than one resource set can be transmitted to one or more mobile stations. The HARQ-ACK timing value k can be a predetermined number, such as 0 or 1, as shown in Table 1. To further illustrate this point, in Example 4, the value of k for slots #n and #n+2 can be zero and two, respectively. The PUCCH length indicates the number of symbols. In this embodiment, the PUCCH resource value of Example 5 is associated with only one channel resource. Thus, in this embodiment, each channel resource group indicated by the channel resource group index includes only one channel resource. The group index or channel resource group index indicates the number of groups allocated to the mobile station.

TABLE 1

Exemplary PUCCH Resource Table

| HARQ-ACK Timing Value, k | PUCCH format | PUCCH length | PUCCH resource value | Group Index |
| --- | --- | --- | --- | --- |
| k = 0 | Long Format 0 | 4 | a0 | 0 |
|  |  |  | a1 | 1 |
|  |  | 6 | a2 | 2 |
|  |  |  | a3 | 3 |
|  | Long Format 1 | 4 | a4 | 4 |
|  |  |  | a5 | 5 |
|  |  | 6 | a6 | 6 |
|  |  |  | a7 | 7 |
| k = 1 | Long Format 0 | 8 | a8 | 8 |
|  |  |  | a9 | 9 |
|  |  | 12 | a10 | 10 |
|  |  |  | a11 | 11 |
|  | Long Format 1 | 8 | a12 | 12 |
|  |  |  | a13 | 13 |
|  |  | 12 | a14 | 14 |
|  |  |  | a15 | 15 |

The network or base station (120) can be configured with a PUCCH resource table, such as Table 1, through radio resource control (RRC) signaling. In some embodiments, the base station (120) transmits RRC message comprising at least one resource set, including any one or more of a HARQ-ACK timing value, a PUCCH format type, a PUCCH length, PUCCH resource value, and a channel resource group index. In some embodiments, the RRC signaling may be in combination with other information, such as mobile station capability or transmission mode. In some embodiments, the base station (120) can also indicate orthogonal cover code (OCC) information and frequency hopping enable or disable information in the RRC message. For example, the base station (120) can also indicate to one or more mobile stations the time domain orthogonal cover code (OCC) and frequency domain OCC. The base station (120) can informs the mobile station (110a) of the channel resource group index using, for example, four bits in the DCI.

Figure 3:
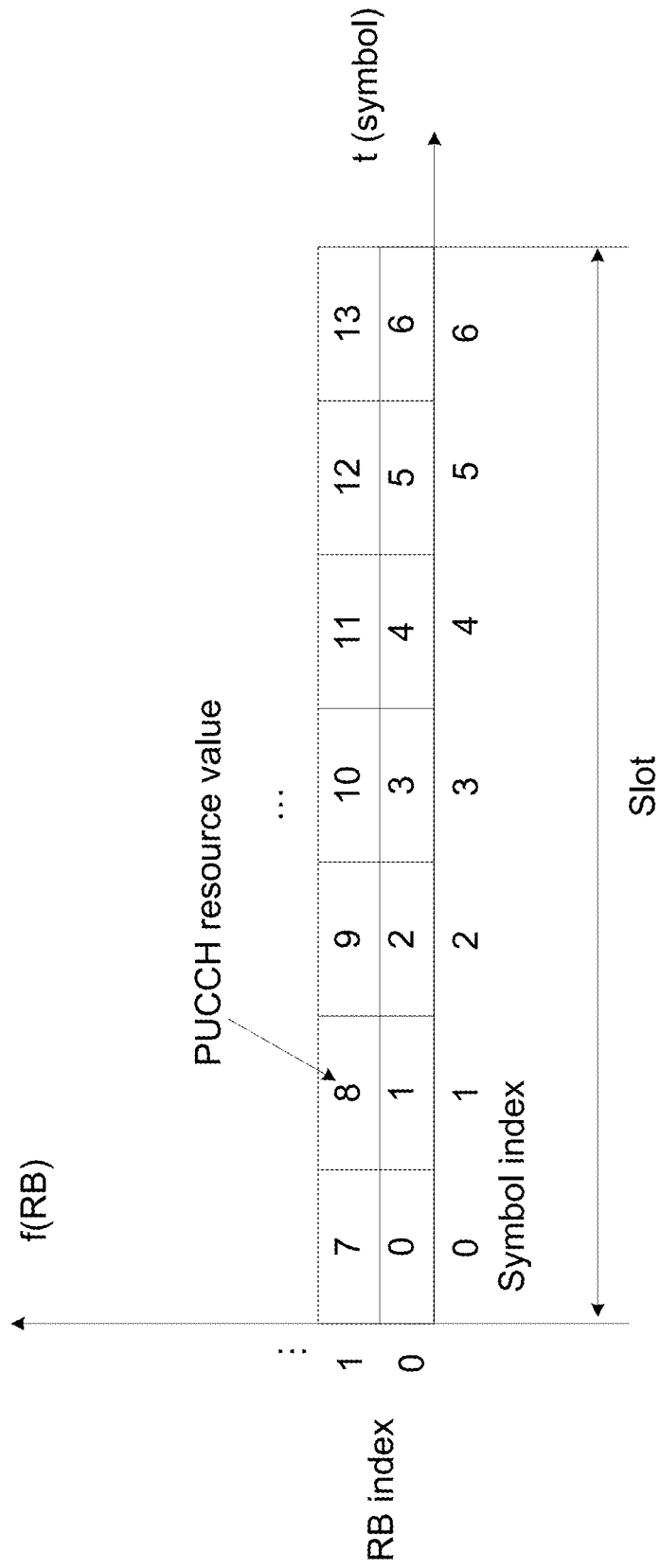
FIG. 3 shows an exemplary mapping of the relationship between PUCCH resource value and symbol index and resource block index.

As shown in FIG. 3, when a mobile station receives the PUCCH resource value, the mobile station can follow up and obtain resources in any one or more of time domain, frequency domain, or code domain for PUCCH transmission. For example, as shown in FIG. 3, a mobile station can map the relationship between PUCCH resource value and PUCCH starting symbol index and starting Resource Block (RB) index. In FIG. 3, the length of a slot in the time domain includes seven uplink symbols. The mobile station maps the PUCCH resource value in the time domain symbol and in the frequency domain resource block. As illustrated in FIG. 3, if PUCCH resource value equals 8, then the mobile station can determine that the starting symbol index is 1 and the starting RB index is 1 In some embodiments, the mobile station can receive the PUCCH resource value and can obtain the other resource information shown in exemplary Table 1 for transmitting the PUCCH.

The intersection of a RB index and the symbol index is associated with a resource subset. In some embodiments, each resource subset comprises one or more resources such as cyclic shift, time domain OCC or frequency domain OCC. Each PUCCH resource value can correspond to one resource. For example, for one or two bits ACK/NACK transmission in long PUCCH format, each resource subset can have 12 cyclic shift values. In such an example, the first resource subset in the first RB and first symbol can have PUCCH resource values 0 to 11. The next resource subset can have PUCCH resource values from 12 to 23, and so on. In some other embodiments, one or more symbols in the time domain combined with one or more RBs in the frequency domain can be defined as a unit corresponding to a resource subset. For example, four symbols and one RB can be the minimum unit for a resource subset. Each resource subset can comprise one or more resources such as cyclic shift, time domain OCC or frequency domain OCC.

In some other embodiments, a mobile station can receive a RRC message for at least one resource set, the RRC message comprises any one or more of a HARQ-ACK timing value, a PUCCH format type, a PUCCH length, PUCCH resource value, a channel resource group index, a time domain orthogonal cover code (OCC), and a frequency domain OCC.

Example 6

In another example, the base station (120) may transmit to mobile station (110b) information from a PUCCH resource table as shown in Table 2 below. In an exemplary embodiment, Table 2 is a resource set that may be used for a one or two symbol PUCCH format carrying up to two bits. In some embodiments, the base station (120) may transmit to the mobile station (110b) information such as PUCCH length and PUCCH RB index, cyclic shift index and group index or channel resource group index.

The exemplary Table 2 includes eight groups, each of which includes resource information. The base station (120) can informs the mobile station (110b) of the channel resource group index using, for example, three bits in the DCI. Each cyclic shift index set in the figure may contain 2 or 4 cyclic shift indices. For example, Set #0 contains the cyclic shift index {0,6}, Set #1 contains the cyclic shift index {3,9}, Set #2 contains the cyclic shift index {0,3,6,9}, and Set #3 contains the cyclic shift index {0,1,2,3}. As another example, if the RB index a0 does not equal to a1, Set #1 and Set #2 can contain the same cyclic shift index. In some embodiments, the one or more ACK/NACK messages transmitted by the mobile station include either two or four cyclic shift indices.

TABLE 2

Exemplary PUCCH Resource Table

| PUCCH length | RB index | Cyclic shift index | Group Index |
|---|---|---|---|
| 1 | a0 | Set #0 | 0 |
|   | a1 | Set #1 | 1 |
| 1 | a2 | Set #2 | 2 |
|   | a3 | Set #3 | 3 |
| 2 | a4 | Set #4 | 4 |
|   | a5 | Set #5 | 5 |
| 2 | a6 | Set #6 | 6 |
|   | a7 | Set #7 | 7 |

The network or base station (120) can be configured with a PUCCH resource table, such as Table 2, using RRC signaling. In some embodiments, the base station (120) transmits radio resource control (RRC) message comprising PUCCH length and PUCCH RB index, cyclic shift index and group index or channel resource group index. In some embodiments, the RRC signaling may be in combination with other information, such as mobile station capability or transmission mode. In some embodiments, the base station (120) can also indicate the starting symbol in the RRC message. In some embodiments, the base station (120) can also indicate the mapping structure of the short PUCCH in the RRC message. For example, the mapping structure of short PUCCH can be mapped in the frequency domain in a comb-like manner or in a continuous manner.

Example 7

In another example, the base station (120) may transmit to mobile station (110b) information from a PUCCH resource table as shown in the exemplary Table 3 below. In an exemplary embodiment, Table 3 is a resource set that may be used for a PUCCH format carrying up to two bits. In some embodiments, the base station (120) may transmit to the mobile station (110b) information such as PUCCH format, PUCCH length and PUCCH resource value, cyclic shift index and group index or channel resource group index. The mobile station can use the PUCCH resource value to further indicate the staring symbol and staring RB as shown in FIG. 3. In some embodiments, each cyclic shift index set for short PUCCH format contains two or four cyclic shift. In some other embodiments, each cyclic shift index set for long PUCCH format contains one cyclic shift. In some embodiments, if 2 bits are to transmitted while the corresponding CS index set only contains two CS, the UE will automatically use another RB, which can be explicitly indicated by the configured RB index.

TABLE 3

Exemplary PUCCH Resource Table

| PUCCH format | PUCCH length | PUCCH resource value | Cyclic shift index | PUCCH resource set index |
|---|---|---|---|---|
| Short Format 0 | 1 | a0 | Set #0 | 0 |
|   |   | a1 | Set #1 | 1 |
|   | 1 | a2 | Set #2 | 2 |
|   |   | a3 | Set #3 | 3 |

TABLE 3-continued

Exemplary PUCCH Resource Table

| PUCCH format | PUCCH length | PUCCH resource value | Cyclic shift index | PUCCH resource set index |
|---|---|---|---|---|
| | 2 | a4 | Set #4 | 4 |
| | | a5 | Set #5 | 5 |
| | 2 | a6 | Set #6 | 6 |
| | | a7 | Set #7 | 7 |
| Long Format 0 | 4 | a8 | Set #8 | 8 |
| | | a9 | Set #9 | 9 |
| | 8 | a10 | Set #10 | 10 |
| | | a11 | Set #11 | 11 |
| | 8 | a12 | Set #12 | 12 |
| | | a13 | Set #13 | 13 |
| | 14 | a14 | Set #14 | 14 |
| | | a15 | Set #15 | 15 |

In some embodiments, the base station configures a separate resource set for PUCCH format carrying up to two bits and PUCCH format carrying more than two bits. In some embodiments, the base station configures a separate resource set for short PUCCH format and long PUCCH format.

Figure 4:
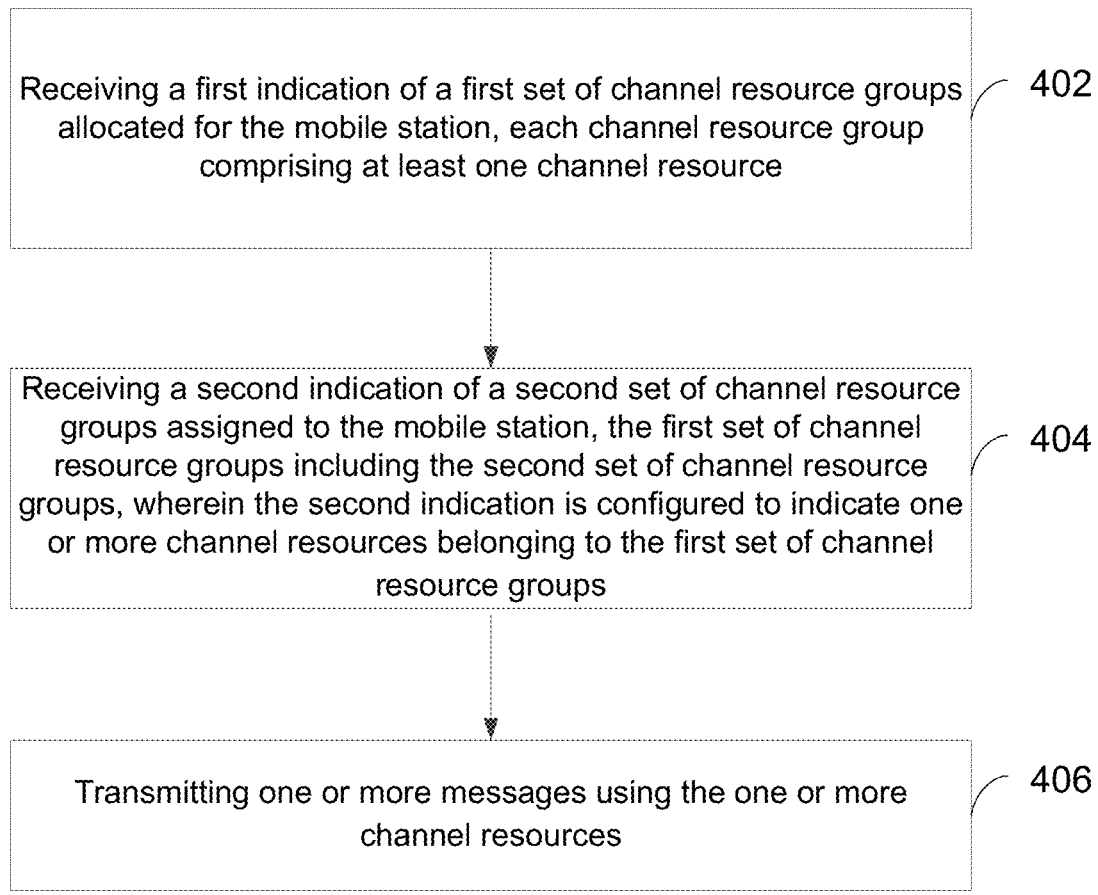
FIG. 4 shows an exemplary flowchart for a mobile station to transmit one or more messages using one or more channel resources.

In some embodiments, the base station (120) may transmit to mobile station (110b) information from a PUCCH resource table as shown in the exemplary Table 4 below. In an exemplary embodiment, Table 4 is a resource set that may be used for a PUCCH format carrying up to two bits. In some embodiments, the base station (120) may transmit to the mobile station (110b) information such as PUCCH format, PUCCH length and PUCCH resource value, time domain OCC, cyclic shift index and group index or channel resource group index. The mobile station can use the PUCCH resource value to further indicate the staring symbol and staring RB as shown in FIG. 4. In some embodiments, each cyclic shift index set for short PUCCH format contains two or four cyclic shift. In some other embodiments, each cyclic shift index set for long PUCCH format contains one cyclic shift. In some other embodiments, the time domain OCC only applies for long PUCCH format. In some embodiments, if 2 bits are to transmitted while the corresponding CS index set only contains two CS, the UE will automatically use another RB, which can be explicitly indicated by the configured RB index.

TABLE 4

PUCCH resource set for formats carrying up to 2 bits

| PUCCH format | PUCCH length | PUCCH resource value | Time domain OCC | Cyclic shift index | PUCCH resource group index |
|---|---|---|---|---|---|
| Short Format 0 | 1 | a0 | — | Set #0 | 0 |
| | | a1 | — | Set #1 | 1 |
| | 1 | a2 | — | Set #2 | 2 |
| | | a3 | — | Set #3 | 3 |
| | 2 | a4 | — | Set #4 | 4 |
| | | a5 | — | Set #5 | 5 |
| | 2 | a6 | — | Set #6 | 6 |
| | | a7 | — | Set #7 | 7 |
| Long Format 0 | 4 | a8 | OCC #0 | Set #8 | 8 |
| | | a9 | OCC #1 | Set #9 | 9 |
| | 8 | a10 | OCC #0 | Set #10 | 10 |
| | | a11 | OCC #1 | Set #11 | 11 |
| | 8 | a12 | OCC #0 | Set #12 | 12 |
| | | a13 | OCC #1 | Set #13 | 13 |
| | 14 | a14 | OCC #0 | Set #14 | 14 |
| | | a15 | OCC #1 | Set #15 | 15 |

In some other embodiments, a similar resource set like Table 4 can be defined for PUCCH formats with more than 2 bits, just replace Column #5 the 'cyclic shift index' by 'the number of RBs'. In some other embodiments, the base station configures only a single resource set for all PUCCH formats.

FIG. 4 shows an exemplary flowchart for a mobile station to transmit one or more messages using one or more channel resources. At the receiving a first indication operation 402 a mobile station receives a first indication of a first set of channel resource groups allocated for the mobile station. Each channel resource group comprises at least one channel resource. At the receiving a second indication operation 404, the mobile station receives a second indication of a second set of channel resource groups assigned to the mobile station. The first set of channel resource groups includes the second set of channel resource groups. The second indication is configured to indicate one or more channel resources belonging to the first set of channel resource groups. In some embodiments, the mobile station may decode one or more channel resources based on the second indication, where the one or more channel resources belongs to the first set of channel resource groups. At the transmitting operation 406, the mobile station transmits one or more messages using the one or more channel resources.

Figure 5:
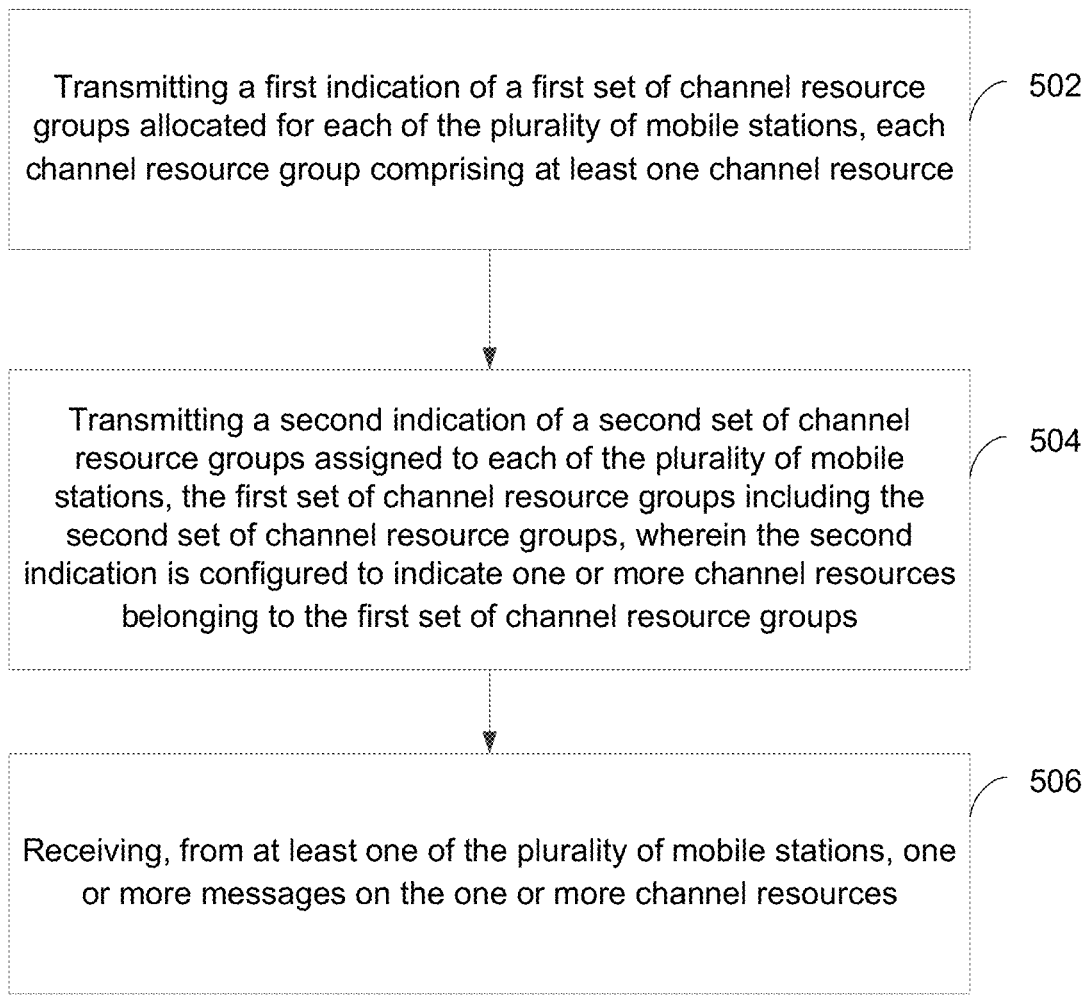
FIG. 5 shows an exemplary flowchart for a base station to allocate and assign channel resource groups to a plurality of mobile stations.

FIG. 5 shows an exemplary flowchart for a base station to allocate and assign channel resource groups to a plurality of mobile stations. At the transmitting a first indication operation 502, the base station transmits a first indication of a first set of channel resource groups allocated for each of the plurality of mobile stations, each channel resource group comprising at least one channel resource. At the transmitting a second indication operation 504, the base station transmits a second indication of a second set of channel resource groups assigned to each of the plurality of mobile stations. The first set of channel resource groups includes the second set of channel resource groups. The second indication is configured to indicate one or more channel resources that belongs to the first set of channel resource groups. At the receiving operation 506, the base station receives, from at least one of the plurality of mobile stations, one or more messages on the one or more channel resources.

Figure 6:
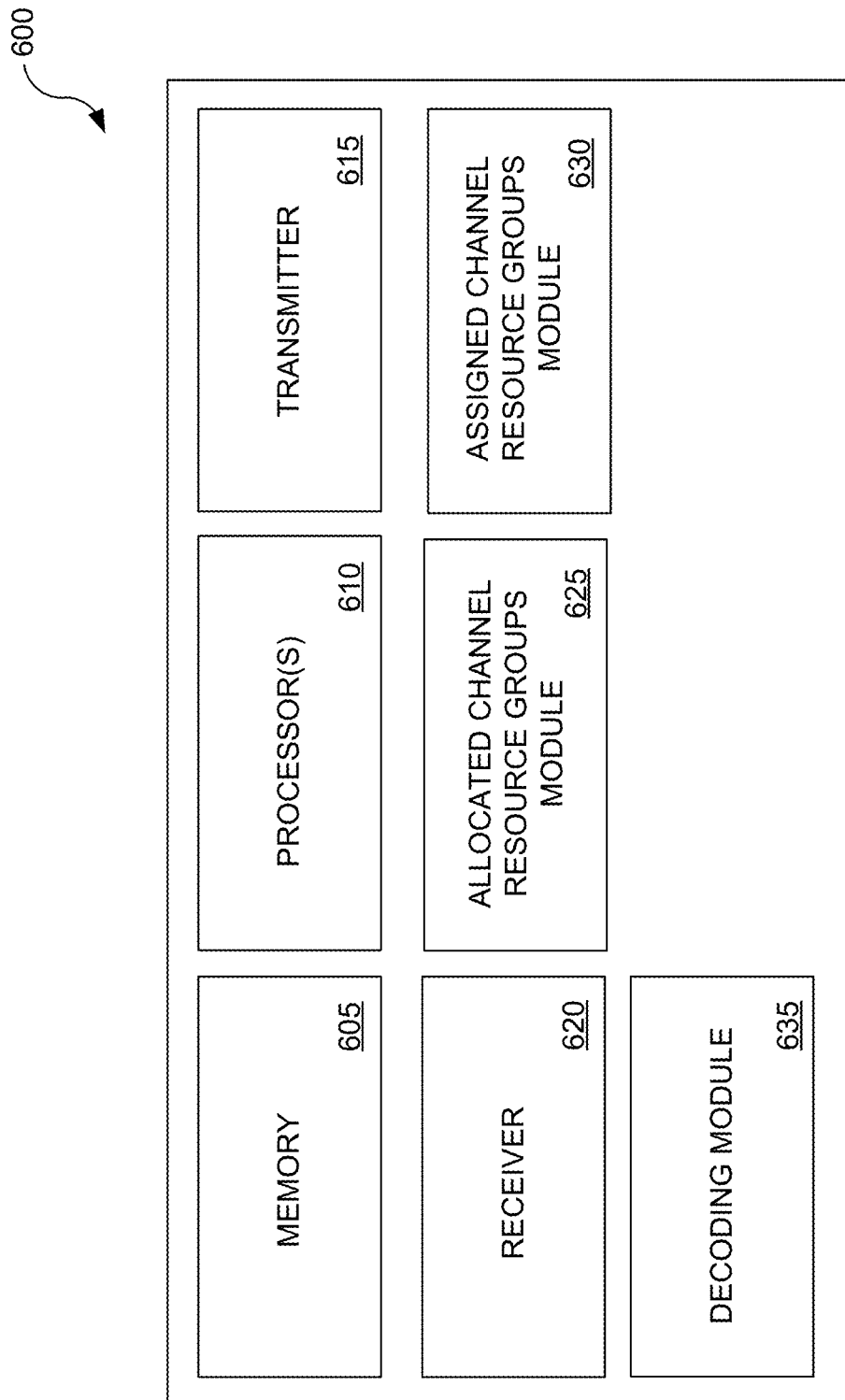
FIG. 6 shows an exemplary block diagram for a mobile station utilizing channel resource groups.

FIG. 6 shows an exemplary block diagram for a mobile station 600 utilizing channel resource groups for transmission of one or more messages, such as ACK/NACK. The mobile station 600 includes at least one processor 610 and a memory 605 having instructions stored thereupon. The instructions upon execution by the processor 610 configure the mobile station 600 to perform several operations using the various modules. The receiver 620 receives the various information or data transmitted by the base station.

The allocated channel resource groups module 625 receives from a base station a first indication of a first set of channel resource groups allocated for the mobile station. Each channel resource group comprises at least one channel resource. The assigned channel resource groups module 630 receives a second indication of a second set of channel resource groups assigned to the mobile station. The first set of channel resource groups includes the second set of channel resource groups. The second indication is configured to indicate one or more channel resources belonging to the first set of channel resource groups. In some embodiments, the mobile station 600 may include a decoding module 635 that decodes one or more channel resources based on the second indication. The one or more channel resources decoded by the decoding module 635 belongs to the first set of channel resource groups. The transmitter 615 transmits one or more messages using the one or more channel resources.

Figure 7:
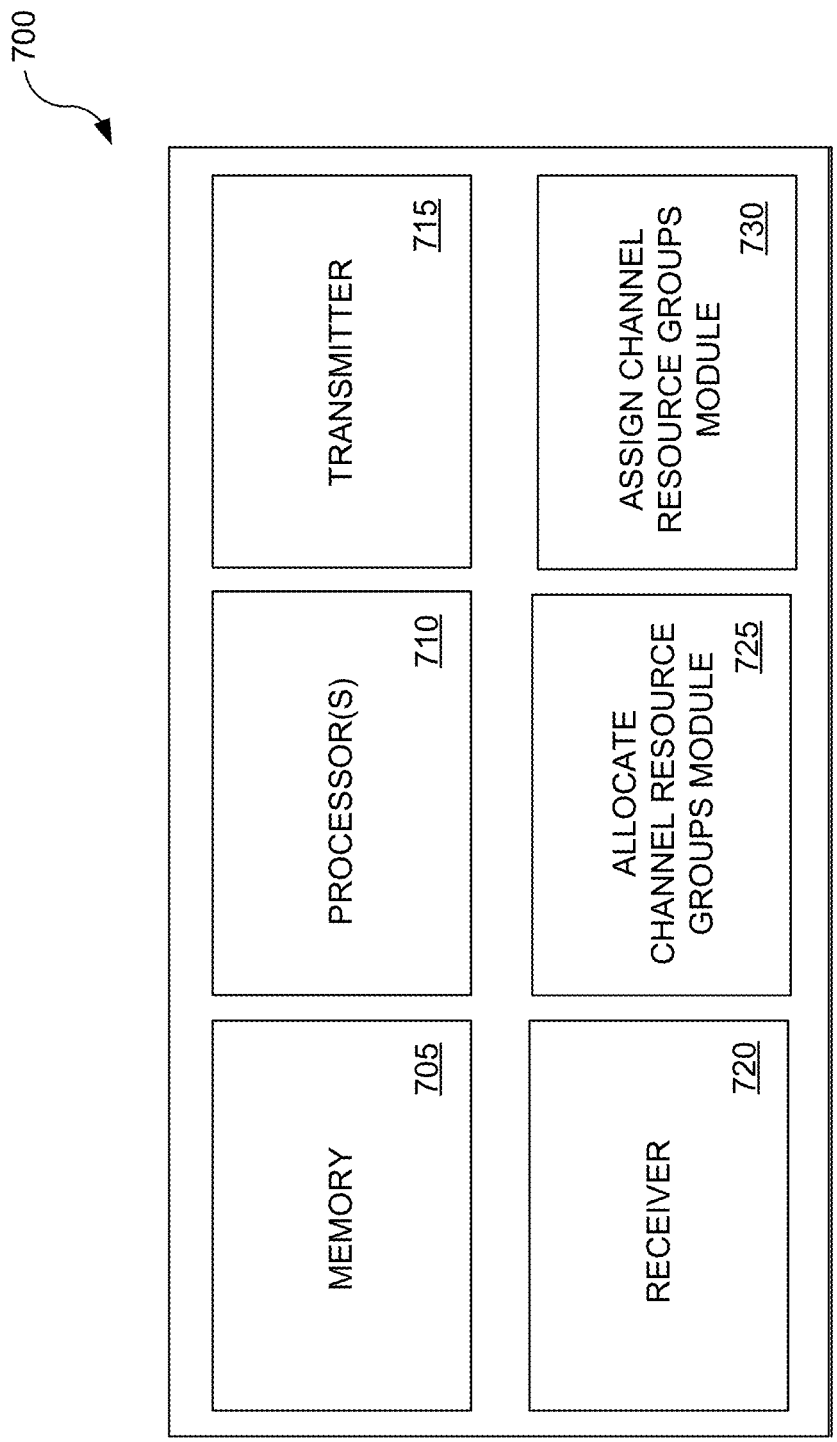
FIG. 7 shows an exemplary block diagram for a base station allocating and assigning the channel resource groups.

FIG. 7 shows an exemplary block diagram for a base station 700 allocating and assigning the channel resource groups for reception of one or more messages, such as ACK/NACK. The base station 700 includes at least one processor 710 and a memory 705 having instructions stored thereupon. The instructions upon execution by the processor 710 configure the base station 700 to perform several operations using the various modules. The transmitter 715 transmits the various information or data to the mobile station.

The allocate channel resource groups module 725 generates a first indication of a first set of channel resource groups allocated for each of the plurality of mobile stations. Each channel resource group comprises at least one channel resource. The transmitter 715 transmits the first indication of a first set of channel resource groups allocated for each of the plurality of mobile stations.

The assign channel resource groups module 730 generates a second indication of a second set of channel resource groups assigned to each of the plurality of mobile stations. The first set of channel resource groups includes the second set of channel resource groups. The second indication is configured to indicate one or more channel resources belonging to the first set of channel resource groups. The transmitter 715 transmits the second indication of a second set of channel resource groups assigned to each of the plurality of mobile stations.

The receiver 720 receives, from at least one of the plurality of mobile stations, one or more messages on one or more channel resources belonging to the first set of channel resource groups The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method performed in a base station, the method comprising:
    transmitting an indication of a plurality of channel resource sets allocated to a mobile station,
        wherein each channel resource set comprises at least one channel resource,
        wherein one or more channel resources in a first channel resource set is configured to carry up to two bits,
        wherein one or more channel resources in a second channel resource set is configured to carry more than two bits, and
        wherein the indication is included in a radio resource control (RRC) message transmitted to the mobile station, the RRC message comprising at least one channel resource set that includes a physical uplink control channel (PUCCH) format type, a PUCCH length, a starting symbol index, frequency hopping enable or disable information, a cyclic shift index, and a time domain orthogonal cover code (OCC); and
    receiving, from the mobile station, a message using a channel resource from one of the first channel resource set and the second channel resource set.

2. The method of claim 1,
wherein the plurality of channel resource sets include physical uplink control channel (PUCCH) resource sets, and
wherein the one or more channel resources includes one or more PUCCH resources.

3. The method of claim 1, wherein the message includes an acknowledgement (ACK) message or a non-acknowledgement (NACK) message.

4. A wireless communication method, comprising:
receiving, by a mobile station, an indication of a plurality of channel resource sets allocated to the mobile station,
wherein each channel resource set comprises at least one channel resource,
wherein one or more channel resources in a first channel resource set is configured to carry up to two bits,
wherein one or more channel resources in a second channel resource set is configured to carry more than two bits, and
wherein the indication is included in a radio resource control (RRC) message received by the mobile station, the RRC message comprising at least one channel resource set that includes a physical uplink control channel (PUCCH) format type, a PUCCH length, a starting symbol index, frequency hopping enable or disable information, a cyclic shift index, and a time domain orthogonal cover code (OCC); and
transmitting, by the mobile station, a message using a channel resource from either the first channel resource set or the second channel resource set.

5. The method of claim 4,
wherein the plurality of channel resource sets include physical uplink control channel (PUCCH) resource sets, and
wherein the one or more channel resources includes one or more PUCCH resources.

6. The method of claim 4, wherein the message includes an acknowledgement (ACK) message or a non-acknowledgement (NACK) message.

7. A non-transitory computer readable program storage medium having code stored thereon, the code when executed by a processor, causing the processor to implement a method comprising:
transmitting an indication of a plurality of channel resource sets allocated to a mobile station,
wherein each channel resource set comprises at least one channel resource,
wherein one or more channel resources in a first channel resource set is configured to carry up to two bits,
wherein one or more channel resources in a second channel resource set is configured to carry more than two bits, and
wherein the indication is included in a radio resource control (RRC) message transmitted to the mobile station, the RRC message comprising at least one channel resource set that includes a physical uplink control channel (PUCCH) format type, a PUCCH length, a starting symbol index, frequency hopping enable or disable information, a cyclic shift index, and a time domain orthogonal cover code (OCC); and
receiving, from the mobile station, a message using a channel resource from one of the first channel resource set and the second channel resource set.

8. The non-transitory computer readable program storage medium of claim 7,
wherein the plurality of channel resource sets include physical uplink control channel (PUCCH) resource sets, and
wherein the one or more channel resources includes one or more PUCCH resources.

9. The non-transitory computer readable program storage medium of claim 7, wherein the message includes an acknowledgement (ACK) message or a non-acknowledgement (NACK) message.

10. A mobile station, comprising:
a processor, and a memory having instructions stored thereupon, the instructions upon execution by the processor configure the mobile station to:
receive an indication of a plurality of channel resource sets allocated to the mobile station,
wherein each channel resource set comprises at least one channel resource,
wherein one or more channel resources in a first channel resource set is configured to carry up to two bits,
wherein one or more channel resources in a second channel resource set is configured to carry more than two bits, and
wherein the indication is included in a radio resource control (RRC) message received by the mobile station, the RRC message comprising at least one channel resource set that includes a physical uplink control channel (PUCCH) format type, a PUCCH length, a starting symbol index, frequency hopping enable or disable information, a cyclic shift index, and a time domain orthogonal cover code (OCC); and
transmit a message using a channel resource from either the first channel resource set or the second channel resource set.

11. The mobile station of claim 10,
wherein the plurality of channel resource sets include physical uplink control channel (PUCCH) resource sets, and
wherein the one or more channel resources includes one or more PUCCH resources.

12. The mobile station of claim 10, wherein the message includes an acknowledgement (ACK) message or a non-acknowledgement (NACK) message.

13. A non-transitory computer readable program storage medium having code stored thereon, the code when executed by a processor, causing the processor to implement a method comprising:
receiving, by a mobile station, an indication of a plurality of channel resource sets allocated to the mobile station,
wherein each channel resource set comprises at least one channel resource,
wherein one or more channel resources in a first channel resource set is configured to carry up to two bits,
wherein one or more channel resources in a second channel resource set is configured to carry more than two bits, and
wherein the indication is included in a radio resource control (RRC) message received by the mobile station, the RRC message comprising at least one channel resource set that includes a physical uplink control channel (PUCCH) format type, a PUCCH length, a starting symbol index, frequency hopping enable or disable information, a cyclic shift index, and a time domain orthogonal cover code (OCC); and transmitting, by the mobile station, a message using a channel resource from either the first channel resource set or the second channel resource set.

14. The non-transitory computer readable program storage medium of claim 13, wherein the plurality of channel resource sets include physical uplink control channel (PUCCH) resource sets, and wherein the one or more channel resources includes one or more PUCCH resources.

15. The non-transitory computer readable program storage medium of claim 13, wherein the message includes an acknowledgement (ACK) message or a non-acknowledgement (NACK) message.

16. A base station, comprising:

a processor, and a memory having instructions stored thereupon, the instructions upon execution by the processor configure the base station to:

transmit an indication of a plurality of channel resource sets allocated to a mobile station, wherein each channel resource set comprises at least one channel resource, wherein one or more channel resources in a first channel resource set is configured to carry up to two bits, wherein one or more channel resources in a second channel resource set is configured to carry more than two bits, and wherein the indication is included in a radio resource control (RRC) message transmitted to the mobile station, the RRC message comprising at least one channel resource set that includes a physical uplink control channel (PUCCH) format type, a PUCCH length, a starting symbol index, frequency hopping enable or disable information, a cyclic shift index, and a time domain orthogonal cover code (OCC); and receive, from the mobile station, a message using a channel resource from one of the first channel resource set and the second channel resource set.

17. The base station of claim 16, wherein the plurality of channel resource sets include physical uplink control channel (PUCCH) resource sets, and wherein the one or more channel resources includes one or more PUCCH resources.

18. The base station of claim 16, wherein the message includes an acknowledgement (ACK) message or a non-acknowledgement (NACK) message.

* * * * *

UNITED STATES PATENT AND TRADEMARK OFFICE
CERTIFICATE OF CORRECTION

| | | |
|---|---|---|
| PATENT NO. | : 11,470,586 B2 | |
| APPLICATION NO. | : 16/800600 | |
| DATED | : October 11, 2022 | |
| INVENTOR(S) | : Xianghui Han et al. | |

It is certified that error appears in the above-identified patent and that said Letters Patent is hereby corrected as shown below:

On the Title Page

In Item (57), under "ABSTRACT", in Column 2, Line 5, delete "channel" and insert -- of channel --, therefor.

On Page 2, in Item (56), under "OTHER PUBLICATIONS", in Column 1, Line 8, delete "Czech ," and insert -- Czech, --, therefor.

In the Specification

In Column 1, Line 62, delete "resources" and insert -- resource --, therefor.

In Column 3, Line 8, delete "resources" and insert -- resource --, therefor.

In Column 4, Line 2, delete "anew" and insert -- a new --, therefor.

In Column 4, Line 37, delete "transmission two" and insert -- transmission of two --, therefor.

In Column 6, Line 9, delete "resources" and insert -- resource --, therefor.

In Column 6, Lines 32-33, delete "transmission two" and insert -- transmission of two --, therefor.

In Column 7, Line 51, delete "dynamic" and insert -- dynamically --, therefor.

In Column 9, Line 17, delete "is 1" and insert -- is 1. --, therefor.

In Column 10, Line 53, delete "to transmitted" and insert -- to be transmitted --, therefor.

In Column 11, Line 42, delete "to transmitted" and insert -- to be transmitted --, therefor.

Signed and Sealed this
Twenty-seventh Day of June, 2023

Katherine Kelly Vidal
*Director of the United States Patent and Trademark Office*

In Column 13, Line 34, delete "groups" and insert -- groups. --, therefor.

In Column 13, Line 47, delete "(DVD)," and insert -- (DVDs), --, therefor.